United States Patent
Bonato et al.

(10) Patent No.: US 6,892,554 B2
(45) Date of Patent: May 17, 2005

(54) DEVICE TO PRODUCE ICE-CREAM

(75) Inventors: Alessandro Bonato, Monticello Conto Otto (IT); Giuseppe Fin, Meolo (IT); Sergio Zanolin, Polcenigo (IT)

(73) Assignee: De' Longhi SpA, Treviso (IT)

( * ) Notice: Subject to any disclaimer, the term of this patent is extended or adjusted under 35 U.S.C. 154(b) by 0 days.

(21) Appl. No.: 10/659,208

(22) Filed: Sep. 9, 2003

(65) Prior Publication Data

US 2004/0045312 A1 Mar. 11, 2004

(30) Foreign Application Priority Data

Sep. 9, 2002 (IT) .................................. UD2002A0190

(51) Int. Cl.[7] .............................................. A23G 9/12
(52) U.S. Cl. ....................................... 62/342; 366/314
(58) Field of Search .................. 62/342, 343; 366/314, 366/331

(56) References Cited

U.S. PATENT DOCUMENTS

| | | | |
|---|---|---|---|
| 4,205,535 A | * | 6/1980 | Maurer ........................ 62/342 |
| 4,392,361 A | | 7/1983 | Cavalli |
| 4,450,692 A | | 5/1984 | Sharpe et al. |
| 4,535,604 A | | 8/1985 | Cavalli |
| 4,545,216 A | * | 10/1985 | Cavalli ........................ 62/343 |
| 4,573,329 A | | 3/1986 | Cavalli |
| 4,583,863 A | * | 4/1986 | Pandolfi ...................... 366/149 |
| 4,681,458 A | * | 7/1987 | Cavalli ....................... 366/149 |
| 4,920,761 A | | 5/1990 | Bukoschek et al. |

FOREIGN PATENT DOCUMENTS

| | | |
|---|---|---|
| DE | 38 06 508 A1 | 9/1989 |
| EP | 0 129 706 A2 | 1/1985 |
| EP | 03019652 A | 1/1991 |
| EP | 0 596 221 A1 | 5/1994 |
| FR | 2 447 703 A1 | 8/1980 |
| FR | 2 491 607 A1 | 4/1982 |
| JP | 01016557 | 1/1989 |
| JP | 02031650 | 2/1990 |
| JP | 02100634 | 4/1990 |
| JP | 02145153 | 6/1990 |
| JP | 03019651 | 1/1991 |
| JP | 03147748 | 6/1991 |
| JP | 2002013847 | 1/2002 |

* cited by examiner

Primary Examiner—William E. Tapolcai
(74) Attorney, Agent, or Firm—Akin Gump Strauss Hauer & Feld, LLP

(57) ABSTRACT

Device to produce ice-cream wherein there is an outer container (11), a cover (26), an inner container (14), a mixing blade (20) including a scraper fin (120), and an evaporator coil (21) located in cooperation with the bottom (17) of the inner container (14) through at least a contact surface (27). The mixing blade (20) is subjected to an axial thrust which keeps the scraper fin (120) pressed elastically at least on part of the bottom (17) of the inner container (14).

12 Claims, 3 Drawing Sheets

DEVICE TO PRODUCE ICE-CREAM

FIELD OF THE INVENTION

The present invention concerns a device to produce ice-cream for ice-cream producing machines.

The present invention is applied to ice-cream producing machines of a domestic or semi-professional type.

BACKGROUND OF THE INVENTION

Machines of a domestic or semi-professional type are known, wherein the container where the ice-cream is formed cooperates with a mixing blade and with means to transfer the cold, or heat absorption means.

The mixing blade takes motion from drive means associated with the cover.

According to a variant, the blade takes motion from drive means located under or at the side of the container and connected to the mixing blade by a drive shaft which passes axially to the container with a cylindrical design. The drive means can be electric or manually driven.

This type of machine, in relation to the chain of cold, has developed different design philosophies in terms of the cooperation of the heat absorption means with the container of the products which are transformed into ice-cream.

A first design philosophy provides a fixed evaporator coil, that is, a coil wherein the temperature of the compressed gas goes down as it expands, which is cylindrical in shape; the coil surrounds the container and leaves an interspace between the coil and the container for the operations to insert and remove the container itself.

This type of solution does not achieve an optimum heat exchange between the coil and the container, given the ring of air which, in fact, is greatly insulating.

To improve the transfer of cold, it was then provided to fill, on each occasion, the ring of air with alcohol or other liquid which does not freeze at the normal working temperatures of the machine.

Apart from the ever-present danger of fire, it is certainly not easy or simple to insert the container into a bath of alcohol. Moreover, there is always the danger of overflow.

A second design philosophy has conceived of an elastic evaporator coil equipped with clamping means, as shown for example in U.S. Pat. No. 4,573,329 and in EP-A-129.706. By acting on the clamping means the evaporator coil opens or closes radially, so that it is possible to insert (or remove) the container by extracting it axially from the coil. When the container is inserted into the evaporator coil, the clamping means are activated and the evaporator coil contracts radially, surrounding, and closely connecting with, the peripheral cylindrical body of the container.

This system guarantees an optimum heat absorption, but it has the drawbacks of the high cost of the evaporator coil and of the fact that it is easily damaged even by a careful user, and even more so by an inattentive user.

Damage to the coil can also entail a dispersion into the environment of dangerous refrigeration gases.

A system is also known, from JP-A-02-145153 and from JP-A-02-100634, which provides that it is the container that is pressed elastically against the rotating mixing blade, by a coil located below. The fact that the inside of the container and the mixing blade are held pressed against each other is important in order to prevent the formation of ice in the cooled zone, as any formation of ice would reduce the heat exchange.

However, the solution described in the Japanese documents indicated above entails problems of safety and correct exploration of the cooled bottom.

Applicant therefore set himself the problem of finding an optimum solution to these problems and surprisingly found, and also studied, experimented and embodied the present invention.

SUMMARY OF THE INVENTION

The present invention is set forth and characterized in the main claim, while the dependent claims describe other innovative characteristics of the invention.

The purpose of the present invention is therefore to improve the behavior of the mixing blade, which not only performs the known function of mixing and introducing air into the ice-cream, but thus performs the function of continuously raising the material, so that the cold transmitted to the bottom of the container and, from this, to the material in contact, is continuously carried upwards with a progressive uniformization of the temperature of the product.

According to the invention, the mixing blade is shaped so as to cooperate elastically with the bottom of the ice-cream container, so as to prevent the formation of ice. Moreover, the invention has set itself the aim of preventing dangers for the operator in the event that the cover is removed and at the same time the blade is left in motion, so that it continues to rotate.

Applicant has also found that the size of the container, that is, the ratio between the usable inner diameter and the height of the level of product which can be obtained (that is, the ice-cream) improves the performance of the device according to the invention.

According to a variant of the invention, this ratio is between 0.30 and 0.50, advantageously between 0.38 and 0.42.

According to the invention, also considering that domestic or semi-professional ice-cream producing machines suffer from natural vibrations, the contact between the intermediate plate with the container and the evaporator coil must always be kept constant, and this constant contact is maintained by a conductive paste or other suitable plastic material, located in cooperation with the coil.

According to the invention, the contact between the container and the plate-coil system is maintained elastically due to the elastic thrust towards the container of the evaporator coil while the container remains fixed, in the working phase.

According to the invention, the evaporator coil deforms elastically according to the thrust that it receives towards the container; this improves the heat yield.

According to another variant, the coil is incorporated into a melted material, such as copper, aluminum or suchlike or into said conductive paste, in order to improve the distribution and uniformity of the cold.

BRIEF DESCRIPTION OF THE DRAWINGS

These and other characteristics of the present invention will become apparent from the following description of a preferential form of embodiment, given as a non-restrictive example with reference to the attached drawings wherein.

DETAILED DESCRIPTION OF THE INVENTION

Figure 1A:
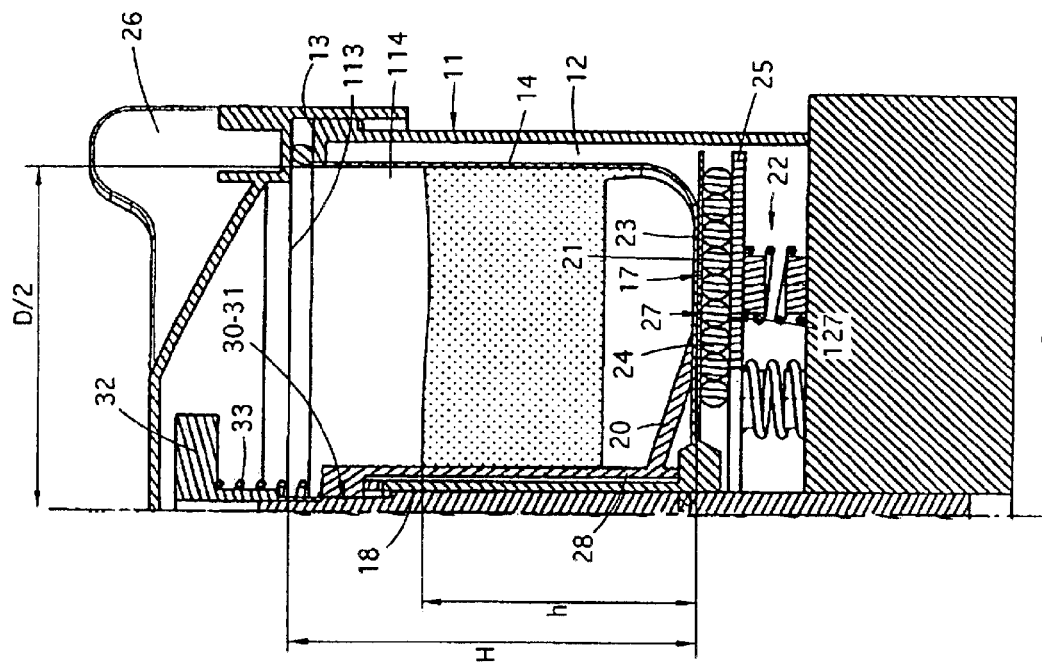
FIGS. 1a and 1b show two practical embodiments of the invention in a respective vertical semi-section.
Figure 1B:
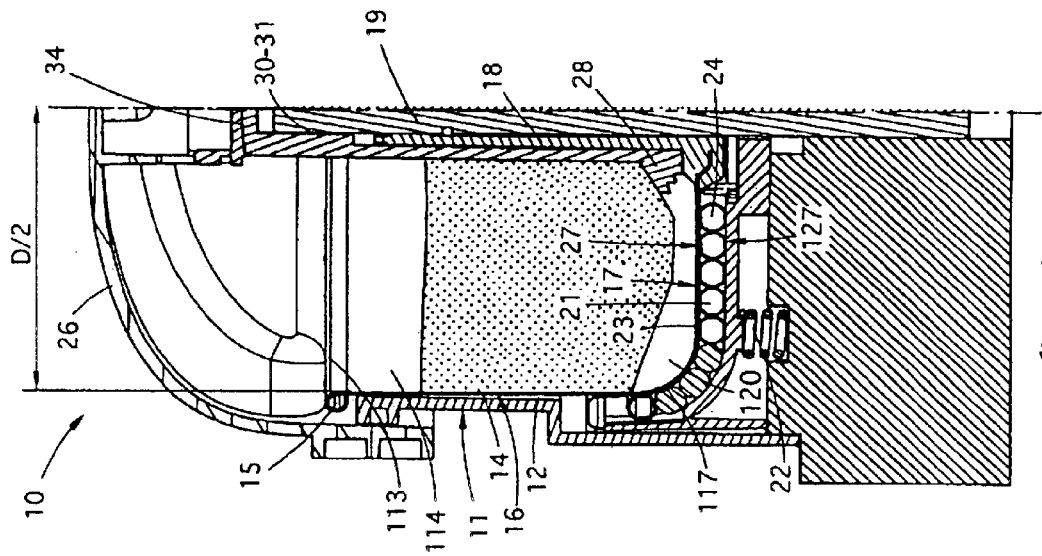

In FIGS. 1a, 1b, which represent, in two different formulations, the part of the ice-cream producing machine to which the invention is applied, the device 10 can be seen; in both the formulations it is composed of a containing unit 11, or outer container, having a housing compartment 12, a supporting edge 13, a supporting and contrasting edge 113 and a cover 26.

In the housing compartment 12, and cooperating with the supporting edge 13 and with the cover 26, there is an inner container 14, hereafter simply container, having a positioning edge 15, a cylindrical body 16, a bottom 17 and an axial guide tube 18. In this case, the bottom 17 is flat and connects with the cylindrical body 16. The container 14 includes an inner compartment 114.

The drive shaft 19 moves and rotates, in a protected position, inside the guide tube 18, driven by drive means not shown here since they are already known, which gives motion to the mixing blade 20.

In the case shown, the bottom 17 is flat on the outside and cooperates with an evaporator coil 21 and with a base 25, through mating contact surfaces, upper 27 and lower 127. The upper contact surface 27 is pressed against the bottom 17 of the container 14 by a plurality of elastic means 22, in this case helical springs, which rest on the bottom of the housing compartment 12.

The evaporator coil 21, in this case, consists of a supporting and transmission plate or foil 23, a coil element 24 and a base or support 25, heat insulated towards the bottom.

The elastic means 22 press on the base 25.

The coil element 24 is connected to the refrigeration system of the machine.

In this case, between the plate 23 and the base 25, according to the invention, material with a high coefficient of heat conduction can be inserted which fills all the spaces left free by the coil element 24.

In the case of the embodiment in FIG. 1b, the evaporator coil 21 operates only on the bottom 17.

In the case of the embodiment in FIG. 1a, the evaporator coil 21 also operates on the rounded edge 117 of the container 14.

In both cases, the plate or foil 23 is made of heat conductive material, so as not to impede the heat exchange and at the same time make it possible to clean the compartment 12.

The base or support 25 is advantageously made of plastic.

The coil element 24 is made of copper pipe with a limited thickness in order to improve the heat exchange.

The coil element 24, after being conformed according to the geometric development of the exchange surface of the container 14, can be subjected to a heading action able to create at least an upper contact surface 27, and advantageously a lower contact surface 127 too.

The contact surfaces 27, 127 include a plane segment which increases the heat exchange surface.

The springs 22 can be metal or plastic material and can consist of a plurality of ring-shaped elements, or of a single ring-shaped element; they achieve an overall thrust of between 20 and 60 kg, advantageously 35÷45 kg.

When the container 14 is in its seating and the cover 26 is in position, as a result of this thrust, together with the thickness of the tube, the coil element 24 deforms in an elastic field, guaranteeing an improved contact.

The drive shaft 19 is connected at the upper part in a known manner and can be removed from the mixing blade 20.

The mixing blade 20 has a scraper fin 120 that cooperates with the part of the inner compartment 114 that is directly involved in the heat exchange, in order to prevent the formation of ice.

In relation to both solutions in FIGS. 1a and 1b, the mixing blade 20 has a sealing packing 28, possibly with a cleaning function, which prevents any material from depositing between the blade 20 and the axial guide tube 18 of the container 14.

The drive shaft 19 has key means 30 on its upper part which cooperate with a seating 31 present in the mixing blade 20, the means 30 and 31 allowing the blade 20 to be axially removed with ease.

In relation to the solution in FIG. 1b, the drive shaft 19 cooperates at the upper part with a removable knob 32, which acts on spring means 33 which abut axially on the mixing blade 20, obliging it to remain pressed against the bottom 17.

In relation to the solution in FIG. 1a, the mixing blade 20 cooperates at the upper part, through a seating 34, with the cover 26. As a consequence, the elasticity of the scraper fin 120, that is, of those blades that act on the bottom 17, creates the desired continuous elastic contact.

Consequently, in this second solution the mixing blade 20 can be removed axially in a natural manner, preventing dangers for the user, since the removal interrupts the transmission of motion.

The solution in FIG. 1b has the same advantage, since the free (although still elastically contrasted) axial travel of the blade 20 is greater than the length of the circumferential connection segment 30–31.

The cover 26 is anchored to the outer container 11 by means of a rotation system which provides one or more approaching ramps in order to simplify and make closing less difficult for the operator.

The approaching ramps determine the reciprocal axial position of the cover 26 with respect to the outer container 11. The operator can therefore determine the reciprocal position of the outer container 11 and the cover 26. This means that in relation to the confirmation of the ramps, that is, the circumferential position of the cover 26 with respect to the ramps, a greater or lesser compression is determined of the container 14 on the evaporator coil 21 and hence a greater or lesser adhesion between the reciprocal contact surfaces.

In this case, to give an example, the container 14 has the following ratios if we assume the diameter D as 1; H, that is, the total height of the container is 0.55; h, that is, the usable height for the level of ice-cream is between 0.30 and 0.50, advantageously between 0.38 and 0.42, in this case 0.37.

Figure 2A:
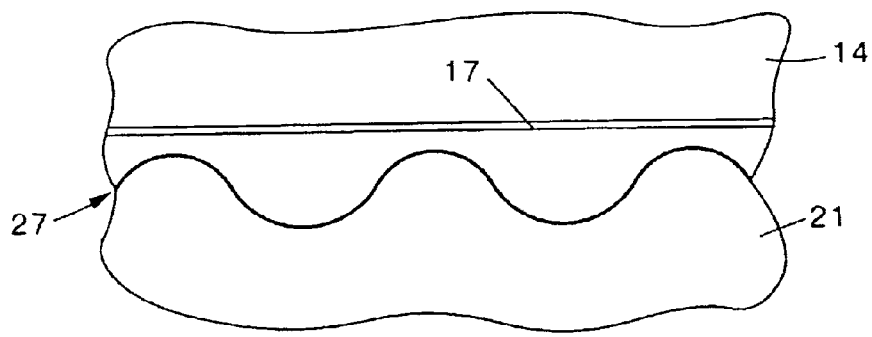
FIGS. 2a, 2b and 2c show some possible conformations in section of the possible rings present between the mating contact surfaces, said rings being obtained in additional material.
Figure 2B:
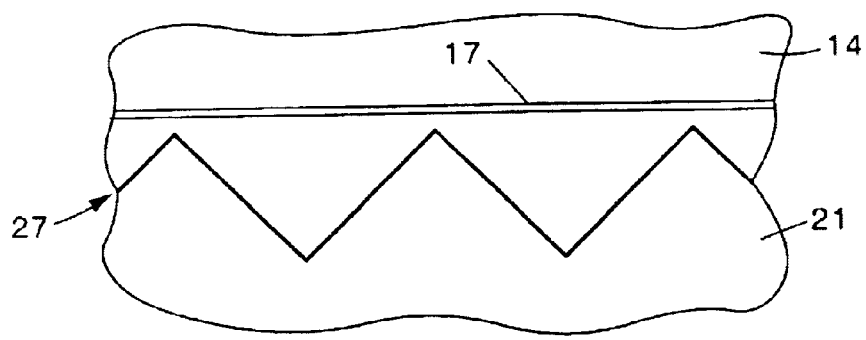
Figure 2C:
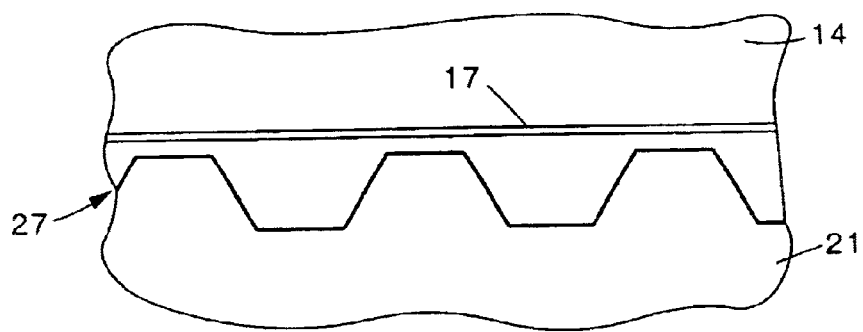
Figure 3A:
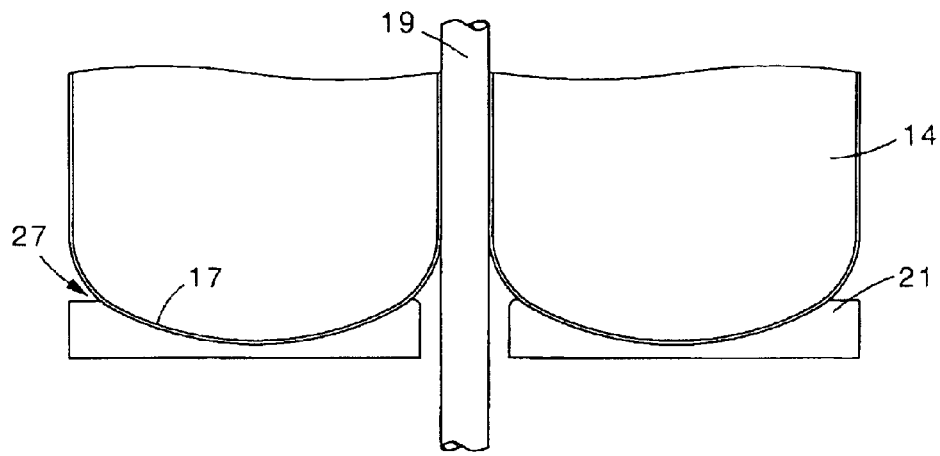
FIGS. 3a, 3b and 3c show some possible conformations of the bottom of the container defining mating contact surfaces.
Figure 3B:
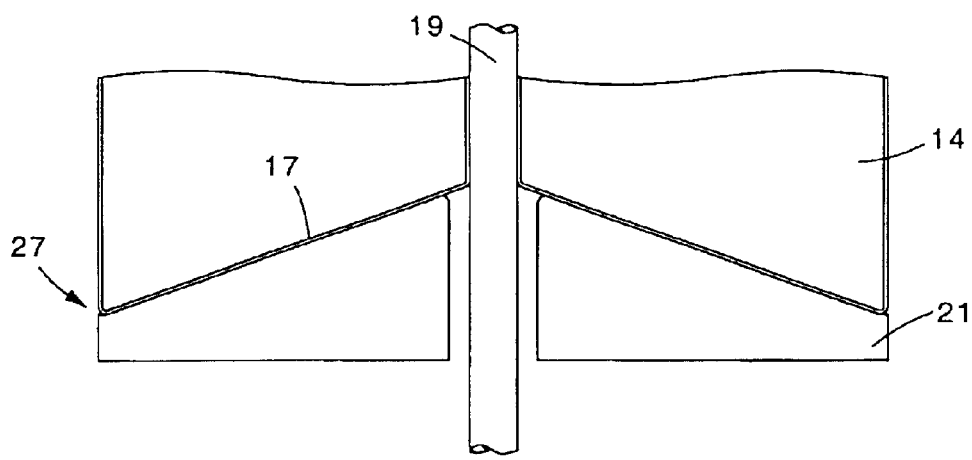
Figure 3C:
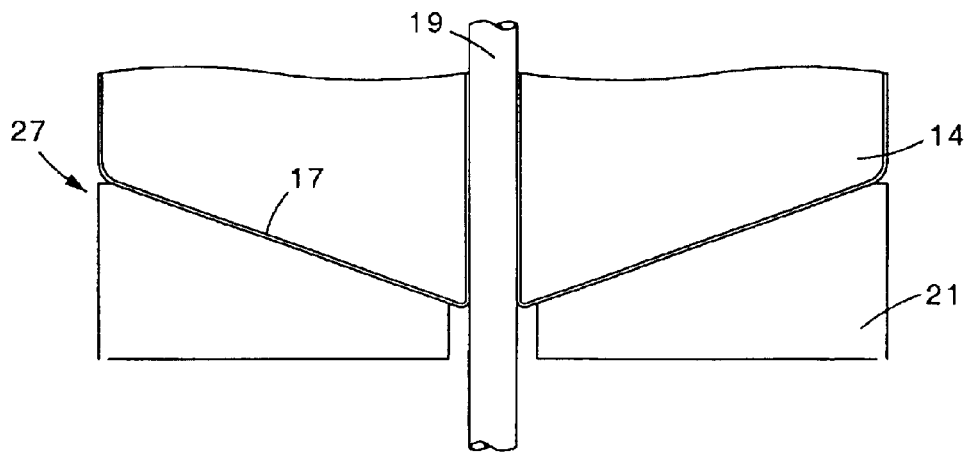

According to the variant FIGS. 2 and 3, the coupling between the bottom 17 of the container 14 and the mating upper contact surface 27 of the coil 21 can assume various forms, such as rings having a geometric profile (wavy, V-shaped, fretted, etc.) (FIGS. 2a, 2b and 2c), arc-shaped (FIG. 3a), inner V-shaped (FIG. 3b) or outer V-shaped (FIG. 3c).

Variants of an artisan nature can be applied to the inventive idea, but these shall remain within the field and scope of the present invention.

What is claimed is:

1. Device to produce ice-cream applied to ice-cream producing machines of a domestic or semi-professional type which cooperates with a refrigeration unit, the device comprising an outer container (11), a cover (26), an inner container (14) including an axial tube (18), a mixing blade (20) including a scraper fin (120), an evaporator coil (21) to remove heat from the inner container (14) and, through this, from the material present therein, the mixing blade (20) being associated at the upper part, in axially removable manner, with a drive shaft (19) driven in rotation by drive means and inserted into said axial tube (18), wherein the evaporator coil (21) is located in cooperation with the bottom (17) of the inner container (14), through at least a contact surface (27), at least said scraper fin (120) being made of an elastic material, and said mixing blade (20) being arranged to axially cooperate directly with said cover (26) through a seating (34) in order to be thrust axially by said cover (26) against the bottom (17) of said inner container (14) such that at least said scraper fin (120) is elastically compressed to at least partially conform to the shape of the bottom (17).

2. Device as in claim 1, characterized in that the mating contact surfaces (27) of the bottom (17) and of the evaporator coil (21) are flat.

3. Device as in claim 1, characterized in that the mating contact surfaces (27) of the bottom (17) and of the evaporator coil (21) have a plurality of rings having a geometric profile (wavy, V-shaped, etc.).

4. Device as in claim 1, characterized in that the mating contact surfaces (27) of the bottom (17) and of the evaporator coil (21) have an arc-type development.

5. Device as in claim 1, characterized in that the mating contact surfaces (27) of the bottom (17) and of the evaporator coil (21) have a V-shaped development (inner or outer).

6. Device as in claim 1, characterized in that the diameter of the bottom (17) is in ratio to the height occupied by the ice-cream in the inner container (14) inside a range which goes from about 0.30 to about 0.50, advantageously from about 0.38 to about 0.42.

7. Device as in claim 1, characterized in that the evaporator coil (21) comprises a coil element (24) incorporated in a material with a high coefficient of heat transmission.

8. Device as in claim 1, characterized in that the mixing blade (20) is conformed so as to thrust upwards the material present in the inner container (14).

9. Device to produce ice-cream applied to ice-cream producing machines of a domestic or semi-professional type which cooperates with a refrigeration unit, the device comprising an outer container (11), a cover (26), an inner container (14) including an axial tube (18), a mixing blade (20) including a scraper fin (120), an evaporator coil (21) to remove heat from the inner container (14) and, through this, from the material present therein, the mixing blade (20) being associated at the upper part, in axially removable manner, with a drive shaft (19) driven in rotation by drive means and inserted into said axial tube (18), wherein the evaporator coil (21) is located in cooperation with the bottom (17) of the inner container (14), through at least a contact surface (27), said mixing blade (20) being subjected to an axial thrust which keeps the scraper fin (120) pressed elastically at least on part of the bottom (17) of the inner container (14), wherein the drive shaft (19) has at its upper part a removable knob (32), cooperating with spring means (33) in order to exert the axial thrust on the mixing blade (20).

10. Device as in claim 9, characterized in that the free axial travel of the mixing blade (20) is greater than the length of the circumferential connection segment.

11. Device as in claim 1, characterized in that the inner part of the mixing blade (20) includes sealing means (28) cooperating with the axial tube (18).

12. Device as in claim 1, wherein said mixing blade (20) is connected to said drive shaft (19) through key means (30) which cooperate with a seating (31) along a circumferential connection segment (30, 31), said mixing blade (20) sliding axially with respect to said drive shaft (19), the free axial travel of said mixing blade (20) being greater than the length of the circumferential connection segment (30, 31) between the mixing blade (20) and the drive shaft (19), such that, lacking the thrust of said cover (26), said mixing blade (20) slides axially to disengage the key means (30) from the seating (31) to remove said mixing blade (20) from said drive shaft (19) and interrupt transmission of motion from said drive shaft (19) to said mixing blade (20).

* * * * *